March 5, 1974 — R. C. MILDNER — 3,795,540

CABLE SHIELDING TAPE

Filed Sept. 30, 1966

INVENTOR.
Raymond C. Mildner
BY
Griswold & Burdick
ATTORNEYS

United States Patent Office 3,795,540
Patented Mar. 5, 1974

3,795,540
CABLE SHIELDING TAPE
Raymond C. Mildner, Midland, Mich., assignor to The Dow Chemical Company, Midland, Mich.
Continuation-in-part of application Ser. No. 509,814, Nov. 26, 1965, which is a continuation-in-part of application Ser. No. 325,701, Nov. 22, 1963, both now abandoned. This application Sept. 30, 1966, Ser. No. 587,367
Int. Cl. B32b 15/08, 15/20; B44d 1/09
U.S. Cl. 117—226
20 Claims

ABSTRACT OF THE DISCLOSURE

A metal element and a plastic element in a cable are securely bonded together by means of an adhesive thermoplastic polymer comprising a copolymer of ethylene and an ethylenically unsaturated carboxylic acid such as acrylic acid. The metal element can be in the form of a tape or metal strip of aluminum having one or both sides coated with or laminated to the adhesive thermoplastic polymer. The tape including the coated or laminated adhesive thermoplastic polymer is disposed within a cable at the desired location such that the adhesive thermoplastic polymer forms a strong bond with an adjacent element in the cable.

---

This is a continuation-in-part of a copending application Ser. No. 509,814, filed Nov. 26, 1965, now abandoned, which in turn is a continuation-in-part of an application Ser. No. 325,701, filed Nov. 22, 1963 now abandoned.

This invention relates to electric conductors such as cables. More particularly, it relates to improved electric conductors wherei na metal element is securely bonded to a plastic material by means of a particular kind of adhehive copolymer.

Electric conductors such as cables in which there is at least one metallic element or part and at least one plastic part are known. In the simplest constructions, the conductor may be the only metallic part, in the form of a single or multiple strand, encompassed within an enveloping jacket which may be a unitary plastic composition or may have a built-up construction of two or more plastic layers or a combination of plastic layers with layers of other materials. In more complex constructions there may be other metallic elements such as coaxial metal shields, return conductors, tensile elements, armor elements, etc. The plastic parts may be, or provide, the dielectic insulation around the conductor, the spacing or separation of the go conductor from the return conductor, the spacing or isolation of the conductor from the metallic shielding, the external jacket outside of the shield, or combinations thereof. The plastic part is usually a dielectric composition, but may be a semiconducting material.

The design of the conductor or cable in known manner is in accord with whether its use is to be in communication or power, in aerial, submarine, or underground service, at high or low voltage or frequency.

In diverse ways, the known cable constructions and materials are not entirely satisfactory. In some instances, the metal and plastic parts tend to slip relative to one another; thus, for example longitudinal tension applied through an enveloping plastic jacket is not adequately transmitted to the tensile elements of the cable but causes the jacket to slip and elongate with consequential damage to the cable construction, e.g. by wrinkling, slipping, and separation of the jacket from the core.

In one kind of conventional cable construction, a conductor core, comprising one or more metal conductor elements, is surrounded by a plastic insulation which in turn is enveloped in a metallic shield, often a longitudinally folded strip, and further enclosed in a seamless outer jacket of plastic material. The construction is intended to provide sealing for protection of the insulated core. However, because of the lack of adequate bond between the metal parts and the thermoplastic parts, any moisture or air which penetrates the cable, e.g., by permeation of the jacket wall, or through an imperfection resulting from manufacture or damage occurring during installation or service, can seep axially along the cable causing corrosion of the metal parts and ultimate failure of the cable.

Cable failures often occur when the cable is bent on a radius which is too small, or is bent, straightened, and oppositely bent, or is bent and straightened once too often. The forces of compression and extension in the bent portion of the cable cause separation of the component parts, wrinkling or other damage, and premature failure of the cable. While such failures can sometimes be minimized by employing corrugated parts such as the metal shield, they are not entirely eliminated thereby. Moreover, cables utilizing corrugated metal shields are more bulky than is desired.

In accordance with this invention, improved electric conductors such as cables are provided in which at least one metallic part is securely bonded to at least one neighboring plastic part at a common surface of contact by means of certain adhesive copolymer materials hereinafter defined. In one embodiment of the present invention, a cable such as a submarine cable having a metal shield betwixt an insulated core and an outer jacket is improved by securely bonding the metal shield both on its inner side to the core and on its outer side to the outer jacket. In another embodiment, a cable having an electrical conductive jacket around a metal shield (intended for protection against stray currents and lightning bolts when used underground) is improved by securely and conductively bonding the conductive jacket to the metal shield. In accordance with this invention, at least the boundary layer of the plastic part at the common surface of contact and bond with the metallic part comprises a thermoplastic polymer of ethylene modified by monomers containing reactive carboxyl groups, more specifically copolymers of ethylene and an ethylenically unsaturated carboxylic acid, as fully set forth below.

The accompanying drawing represents and illustrates some of various conductors and cables whose construction is improved in accordance with the present invention, the figures of the drawing being schematic and not necessarily to scale, showing the relationship of the parts.

Figure 1:
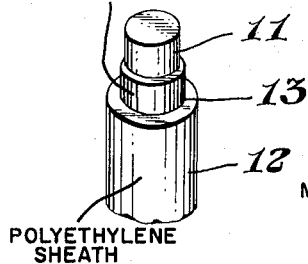
FIG. 1 is a cutaway view of an end of a simple metal conductor with plastic insulation.

The figures of the drawing will be further described in connection with the description of the invention set forth below.

Thus, electrical conductors such as wires and cables for communication or power and for aerial, submarine or underground service at various voltages and frequencies are in general respects constructed in manner known to the art and particularly improved in accordance with this invention by providing a secure bond between at least one metallic part and a neighboring plastic part. The resulting articles are robust and more resistant to damage. Because of their bonded construction, the dimensions of some of their component parts can be reduced with resulting savings in material cost and advantages in manufacture, storage, and handling in installation and service. In one form, the conductors of this invention have at least a boundary layer of a thermoplastic polymer of ethylene and an ethylenically unsaturated carboxylic acid as hereinafter defined at the common surface of contact and bond of a metallic part and a non-metallic part of the construction. In accordance with this form of the present improvement, the non-metallic, plastic part of the construction can itself be comprised of the defined adhesive ethylene polymer, thereby inherently providing the specified boundary bonding layer for the common surface of contact with the metal part. Alternatively, a layer of the defined ethylene copolymer can be interposed between the metal part and a conventional plastic part, the defined ethylene copolymer layer being thereby bonded to the metal part on one side and to the conventional plastic part on the other side. In such construction, the defined ethylene copolymer layer can be relatively thick, in effect constituting a built up structure with the other parts, or can be relatively thin, in effect constituting a bonding adhesive between the neighboring metal and non-metallic parts.

It will be evident to those skilled in the art that the improvements of this invention can be obtained by modifying conventional wire and cable constructions and fabrication methods in various ways. In some instances, the thermoplastic composition for use in fabricating a part can be composed in whole or part of material capable of bonding to the metal part, i.e., the defined ethylene-unsaturated acid copolymer. Thus, for example, a conductor can be covered with an insulating sheath by extrusion of a thermoplastic insulation composition comprising the defined copolymer to provide a bonded sheath. This technique also provides an insulated core whose exterior surface is comprised of the defined polymer and is suitable for application of a metal shield, e.g., a longitudinally folded metal strip or helically wound tape or the like, which thereby becomes bonded to the core through the surface of defined copolymer. Alternatively, an insulated core structure can be fabricated from conventional materials in the usual way to provide a conventional plastic part, and (prior to adding the metal shield) the outer surface of the prefabricated core can be provided with a continuous surface layer or coating of bonding material such as the defined adhesive polymer, whereby the subsequently applied metal shield becomes bonded to the insulated core structure, e.g., through the intermediate surface of the defined copolymer. In another embodiment, the metal strip or tape to be used in construction can be first provided with a coating or covering layer of the defined adhesive polymer or other bonding material on one or both sides of such metal strip or tape which is then fabricated into a shield over the core, being bonded thereto through the coating or layer. Suitable thicknesses for the metal strip or tape is from about 0.5 mil to about 25 mils. If the binder coating or layer is on both sides of the shield, or the shield is fabricated on the core so that the coated surface of the metal strip is outermost, the binder advantageously provides a base for bonding a jacket material, e.g., a thermoplastic sheath, to the shielded core, the jacket material being a conventional composition. Alternatively, a metal shielded core sub-assembly can be farbricated in usual manner from conventional materials, and, in accordance with this invention, a layer or coating of the binder can be applied to that shielded core before applying the jacket material which thereby becomes bonded to the metal shield part, e.g., through the adhesive polymer layer. The intermediate binder layer can be extruded over the shielded core or applied in other ways. Alternatively, the jacket composition may be made up to include or consist essentially of the defined binder, whereby the jacket composition can be applied directly to a conventional metal shielded core assembly to obtain a structure having the jacket securely bonded to the metal shield. A combination of these alternatives can be used to provide the advantages of the improvement of this invention in securely bonding any of the metal parts of a conductor to any of the neighboring thermoplasitc parts through a boundary layer of the specified adhesive binder, i.e., the defined copolymer of ethylene and unsaturated acid, at their common surface of contact, the particular mechanical design being selected by the manufacture to accomplish the purpose desired. Thus, cables built in accordance with this invention with metallic parts such as shields securely bonded to a neighboring part such as core or jacket or both through a boundary layer at their common surface of contact are resistant to intrusion of fluids between the neighboring parts. In such cables having bonded parts in accordance with this invention, tensile or compressive force applied to one of the parts is transmitted to the other, whereby the cable resists relative displacement and separation of the parts. Such bonded cables are resistant to damage by pulling through ducts and conduits and by suspending unsupported between widely separated poles or towers. Also, such cables are resistant to damage by short radius bending and by repeated bending and straightening.

The invention will be more readily understood by reference to the accompanying drawing, which illustrates some of various conductors and cables whose construction is improved in accordance with this invention.

FIG. 1 represents a simple plastic covered conductor which may be used for power or communication, generally in aerial service. In FIG. 1, 11 is a low resistance metallic conductor, which may be solid or stranded, usually of copper, tinned copper, aluminum, or steel clad with a low resistance metal, having a jacket or sheath 12, usually of polyethylene or other polymer of ethylene, or the like. In accordance with this invention, the plastic sheath 12 is securely bonded to the metal conductor 11 at the common surface of contact 13 by at least a thin coextensive layer of the specified adhesive copolymer of ethylene and unsaturated carboxylic acid. While FIG. 1 is drawn to show only one conductor, it will be understood that there can be two or more conductors 11 separated from each other, within the insulated jacket or sheath 12, each of such conductors being bonded to the sheath 12 at their common surface of contact 13 by means of the specified adhesive copolymer. It will be further understood that the plastic part 12 can comprise or consist of the specified adhesive copolymer.

Figure 2A:
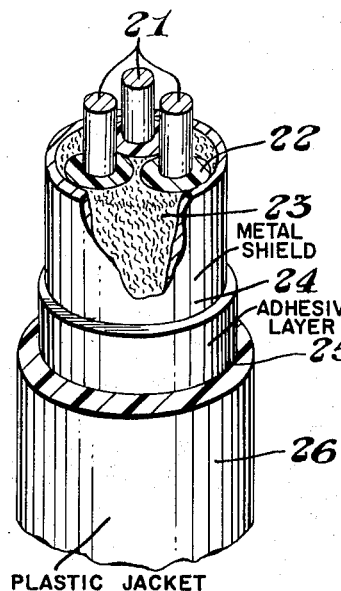
FIG. 2A is a cutaway view of an end.
Figure 2B:
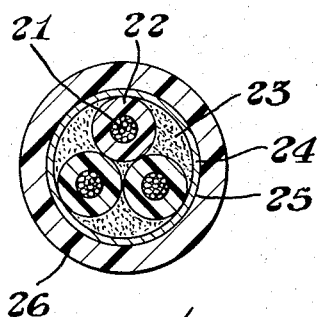
FIG. 2B is a cross-section, of a typical three conductor power cable with a metal shield and exterior plastic jacket.

FIGS. 2A and 2B show a typical three-conductor power cable. The low resistance metal conductors 21, which can be solid or stranded, usually of copper or aluminum, are each insulated, usually with an extruded plastic cover 22 of polyvinyl chloride, polyethylene or rubber, sometimes with impregnated paper. Space fillers 23 of hemp, foamed plastic, or the like are used to provide a substantially circular core assembly which is enclosed in a metal sheath or shield 24, which can be of any ductile metal, usually lead, copper or aluminum. The shield is preferably a seamless tube or a welded or soldered tube. An outer jacket 26, usually extruded plastic, is advantageously bonded to the metal shield 24 at a common surface of contact 25 by means of at least a thin coextensive layer of the specified adhesive copolymer. The layer of specified adhesive copolymer can extend to completely envelop both sides of the metal shield 24.

Figure 3:
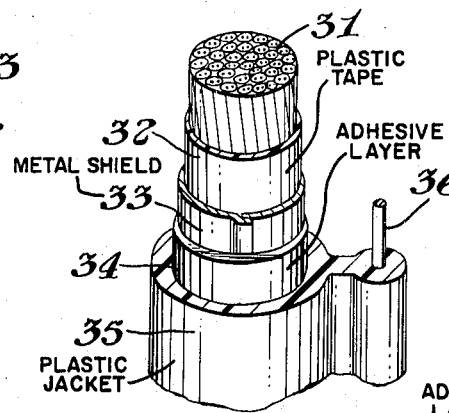
FIG. 3 is a cutaway view of an end of a typical communications cable with multiple pairs in the core, metal shield, and plastic outer jacket.

FIG. 3 represents a typical communications cable for aerial service. In the inner core 31, many pairs of insulated conductors (e.g. plastic coated copper wires) are bundled in a plastic binder tape 32 of polypropylene, polyethylene terephthalate, or the like. The bundle is enclosed in a metal shield 33, which can be of any ductile metal, usually lead, copper, aluminum, or steel, coppered steel, zinc-coated steel, terne plate or other clad metal, or stainless steel, or combinations of such metals. The shield can be a seamless tube, a welded or soldered tube, or a longitudinally folded tape (as shown in FIG. 3), e.g., a longitudinally folded aluminum tape. In cables larger than about ¾ inch in outside diameter, the metal shield 33 is usually corrugated in conventional construction. An outer jacket 35, e.g., extruded polyethylene, in accordance with the present invention, is advantageously bonded to the shield 33 at their common surface of contact 34 by means of at least a thin coextensive layer of the specified adhesive copolymer which can extend to completely cover both sides of the shield 33 and, of course, can be comprised throughout the composition of the plastic jacket 35.

FIG. 3 also shows an additional tensile element 36, for example, a steel messenger wire, laid parallel to the shielded conductor core and enclosed in a common outer jacket 35. In such construction, the tensile element, e.g., steel messenger wire, is advantageously bonded to the jacket material in accordance with this invention. The tensile element 36 can be omitted from the construction of cables of the kind shown in FIG. 3 or alternatively, can be similarly included in the construction of cables of the kind shown in the other figures, where, for convenience, the messenger wire is not shown.

Figure 4:
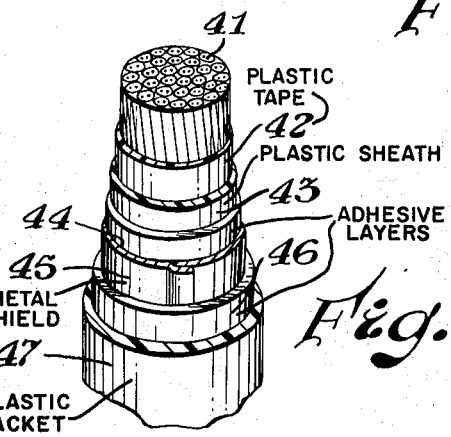
FIG. 4 is a cutaway view of an end of another typical communications cable having multiple pairs in the core with extruded inner jacket, metal shield, and plastic outer jacket.

FIG. 4 represents a communications cable for use while buried in the ground. In the inner core 41, pairs of insulated conductors, e.g., plastic coated copper wires, are bundled in a plastic binder tape 42 (like tape 32 in FIG. 3) over which is extruded a seamless plastic sheath 43, e.g., of polyethylene. A metal shield 45 (e.g. longitudinally folded aluminum or other material or construction as described for shield 33 in FIG. 3) is applied over the plastic sheath 43, followed by the outer jacket 47, preferably of polyethylene. In accordance with this invention, the metal shield 45 is advantageously securely bonded to the plastic inner jacket 43 at their common surface of contact 44, and/or to the outer jacket 47 at their common surface of contact 46, in each instance by at least a thin coextensive layer of the herein specified adhesive copolymer.

It will be understood in reference to FIG. 4 that metallic armor, such as steel wires, can be included in the construction, e.g., by laying steel wires in the outer jacket 47. In such constructions, the metallic armor is advantageously bonded to the outer jacket material in accordance with the present invention.

Figure 5:
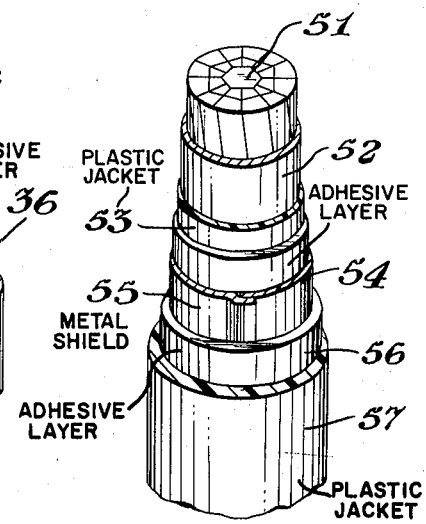
FIG. 5 is a cutaway view of an end of a typical submarine cable with a tensile core, insulated electric conductor, metal shield and plastic outer jacket.

In the submarine cable represented by FIG. 5, 51 is a tensile core, e.g., of shaped steel strands, around which is the electrical conductor 52 of copper or aluminum. The insulating inner jacket 53 is preferably extruded polyethylene, over which is laid the metal shield 55 (e.g. copper or aluminum, longitudinally folded tape or other construction as described for the metal shield 33 in FIG. 3). The outer jacket 57 is preferably extruded polyethylene. In accord with the present invention, the metal shield 55 is advantageously bonded to the inner jacket 53 at their common surface of contact 54 and also to the outer jacket 57 at their common surface of contact 56, in each case by at least a thin coextensive layer of the adhesive copolymer as specified herein.

Figure 6:
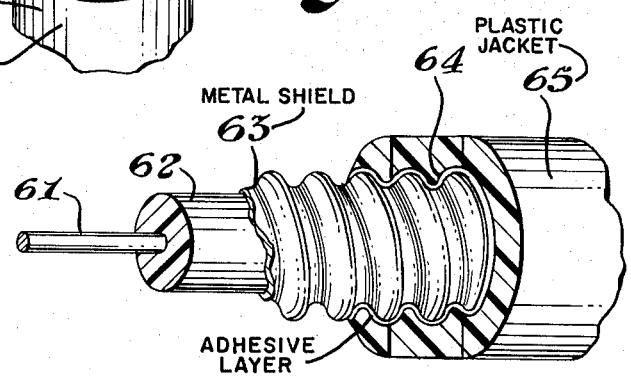
FIG. 6 is a partially sectioned cutaway view of a typical cable having a corrugated metal shield and conductive plastic outer jacket.

In FIG. 6, a cable is shown wherein 61 is a conductor core, which may be one or several separated conductors, for power or communication, set in insulation 62 and enclosed in the metal shield 63, shown as corrugated. The outer jacket 65 is a conductive plastic polymer composition, which in accord with this invention, is securely and conductively bonded to the metal shield 63 at their common surface of contact 64 by at least a thin coextensive layer of the specified adhesive copolymer.

Metal shields heretofore used in construction of cables of the kinds described have been made relatively thick in order to provide inherent strength. While such conventional shields can be employed in the presently improved cables, the advantages arising from securely bonding the metal to the neighboring parts permit the use of relatively thinner shields. Thus, a thin metal foil can be laminated securely on one or both sides with the specified adhesive copolymer and bonded to the inner and outer jackets of a cable, the resulting bonded construction providing strength to the metal shield. In one such embodiment (FIGS. 3 and 4) the shield 33 or 45 is fabricated from a tape in the form of a 3-foil laminate of a thin layer of aluminum bonded between thin layers of the specified ethylene-unsaturated acid copolymer.

In preferred embodiments of this invention, the metal shields 24, 33, 45 and 54 shown in FIGS. 2, 3, 4 and 5, respectively, are tapes of aluminum or copper or other suitable metal, which tapes have been coated, preferably on both sides, with the specified copolymer of ethylene and unsaturated acid. The coated shield tapes are then longitudinally folded around the respective cores, the edges of the shield slightly overlapping. Because the metal tapes can now be relatively thin, two or more of them can be used, of the same or different metals, with their seams remote from each other for greater sealing. For example, in the submarine cable illustrated by FIG. 5, the insulated core 53 can be shielded by a first longitudinally folded tape (not shown) being a double coated thin aluminum tape and further shielded by a second longitudinally folded tape 55 of thin steel, having an adhesive coating on at least the outermost side, with its folded edges diametrically opposite the folded edges of the underlying aluminum shield, the whole being enclosed in the outer jacket 57 and consolidated by heat into a bonded structure. In a preferred embodiment, an out jacket 26, 35, 47 and 57 of polyethylene composition is extruded over the shield, the heat of extrusion being usually sufficient to bond the metal shield to the respective neighboring plastic parts thereby forming an air-tight, moisture-resisting, mechanically strong cable construction. In preferred embodiments, the exterior or outer jacket 26, 35, 47 and 57 is a polymer of ethylene such as polyethylene containing usual stabilizers and approximately 2.5 percent by weight of carbon black for maximum protection against ultraviolet light. Polyethylene is also commonly used as insulation in 12 and 22, on the wires in cores 31 and 41, and in 43 and 53; for these purposes the polyethylene, containing usual stabilizers, may also contain carbon black if desired, but ordinarily is used without carbon black and may contain white pigments or coloring matter for coding.

In the preferred embodiment of the cable shown in FIG. 6, the inner insulating jacket 62 is usually polyethylene and the outer conductive jacket 65 is preferably an ethylene copolymer with an unsaturated ester, especially a copolymer of a major proportion of ethylene and a minor proportion, e.g., from about 5 to about 30 percent by weight, of a lower alkyl ester of an $\alpha,\beta$-ethylenically unsaturated acid, such as ethyl acrylate, which is capable of being relatively heavily loaded with fillers, the conductive composition containing, for example, about 20–50 percent by weight of a conducting carbon such as actylene black. In such cables, the metal shield 63 is preferably coated prior to fabrication with a layer of a conductive composition comprising conductive carbon black such as acetylene black and the specified polymer of ethylene and unsaturated acid which, in the finished cable provides a mechanically strong, electrically conductive bond 64 between the shield and the conductive jacket. Such construction not only insures distribution of stray currents and avoids potential differences between the shield and jacket, but excludes possibly corrosive fluids from the zone between the metal shield and the neighboring plastic parts of the cable. These improvements permit the construction of such cables with little or no corrugation of the metal shield.

When the metal parts, such as the conductor 11 or the shields 24, 33, 45, 55 and 63 or other substrates are coated with the adhesive ethylene-unsaturated carboxylic acid copolymer in practice of this invention, the coating, usually in the order of from about ¼ to 5 mils thick, can be applied in manner known per se by melt extrusion, powder spraying with flame or hot gas gun, by passing the heated part, e.g., metal strip, through a fluidized polymer powder bed, casting from a solvent solution, or fusion of a thin solid film of the copolymer on the substrate.

One advantage of using the ethylene copolymer with ethylenically unsaturated acid as specified in this invention is that the copolymer readily forms a strongly adhesive bond with the metal and such bond is readily formed at mild conditions and with only minor changes in the procedures used in cable manufacture. Moreover, no rigorous cleaning or pretreatment of the metal surface is required. Excellent bonds have been obtained to metal surfaces contaminated with oil. To obtain a good bond, it is only necessary that the adhesive polymer wet the substrate surface and this is readily achieved by employing the polymer in a fluid state and under sufficient pressure to provide good contact between the parts. The adhesive bond of the ethylene-unsaturated acid polymer to and between neighboring parts is readily effected by heating at least to the polymer softening point, e.g., to a temperature of about 140° C. or above, but below the decomposition temperature. The duration of heating and pressing time and pressure are not critical. The necessary conditions are readily attained in the step of making plastic cable parts at heat-plastifying temperature, or by subjecting the cable at intermediate or final stage of manufacture to a brief heat treatment to activate the adhesive and form a secure bond in accordance with this invention.

Another benefit of using cable parts such as metal shields which are coated with the adhesive copolymer in accordance with this invention is that such metal parts, before and after fabrication into cables, are thereby advantageously protected against adverse effects of exposure to air and moisture, resisting oxidation and corrosion, and against mechanical damage in handling.

The adhesive polymer which is used in accordance with this invention is a normally solid thermoplastic polymer of ethylene modified by monomers having reactive carboxyl groups, particularly a copolymer of a major proportion of ethylene and a minor proportion, typically from about 1 to about 30, preferably from about 2 to about 20, percent by weight, of an ethylenically unsaturated carboxylic acid. Specific examples of suitable such ethylenically unsaturated carboxylic acids (which term includes mono- and poly-basic acids, acid anhydrides, and partial esters of polybasic acids) are acrylic acid, methacrylic acid, crotonic acid, fumaric acid, maleic acid, itaconic acid, maleic anhydride, monomethyl maleate, monoethyl maleate, monomethyl fumarate, monoethyl fumarate, tripropylene glycol monomethyl ether acid maleate, ethylene glycol monophenyl ether acid maleate, etc. The carboxylic acid monomer is preferably selected from $\alpha,\beta$-ethylenically unsaturated mono- and poly-carboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. The copolymer may consists essentially of ethylene and one or more of such ethylenically unsaturated acid comonomers or can also contain small amounts of other monomers copolymerizable with ethylene. Thus, the copolymer can contain other copolymerizable monomers including an ester of acrylic acid. The comonomers can be combined in the copolymer in any way, e.g., as random copolymers, as block or sequential copolymers, or as graft copolymers. Materials of these kinds are already known to the art. Thus, copolymers of ethylene and the specified ethylenically unsaturated acids are made by subjecting a mixture of the starting monomers to elevated temperatures, usually from about 90° C. to about 300° C., preferably from about 120° to about 280° C., and at higher pressure, usually above 1000 atmospheres, preferably between 1000 and 3000 atmospheres, preferably in the presence of a free-radical initiator such as oxygen, a peroxygen compound, or an azo compound.

The following examples are illustrative of the invention and are not intended to limit the scope thereof. In the examples, parts and percentages are by weight unless otherwise noted.

EXAMPLE 1

A single strand copper wire is coated with a thin layer of a random copolymer of approximately 92 percent ethylene and approximately 8 percent acrylic acid, having melt index about 6. A concentric jacket of standard polyethylene wire insulation is extruded at heat plastifying temperature over the coated wire. The resulting jacket is securely bonded to the conductor wire.

EXAMPLE 2

A cable is constructed having a conventional core of copper wires enclosed in a polyethylene jacket. An aluminum tape about 12 mils thick, intended to be longitudinally folded about the core in known manner, is first coated on both sides with a thin continuous layer of a random copolymer of approximately 92 percent ethylene and approximately 8 percent acrylic acid, having a melt index about 6. The coated tape is longitudinally folded about the cable core with slightly overlapping edges, after which an outer jacket of polyethylene containing 2.6 weight percent carbon black is extruded at heat plastifying temperature over the shielded core. The heat of extrusion of the outer jacket causes bonding of the metal shield to both inner and outer jackets in contact therewith.

In modifications of this test, the metal shield is coated on one side only with the described copolymer; cables are constructed therefrom having either the inner core or the outer jacket adhesively bonded to the metal shield depending on whether the coated surface is inwardly or outwardly of the shield as folded around the core.

In further modifications, a plain uncoated aluminum tape is used and a thin foil tape of the defined ethylene-acrylic acid copolymer is longitudinally folded over the core beneath the metal tape, or over the metal tape, or both under and over the metal shielding tape. The heat of extrusion of the outer plastic jacket causes bonding of the metal tape to the copolymer foil and through such intermediate layer to the neighboring inner and/or outer jacket.

In another test, a conventional communications cable core having a plurality of insulated conductors is assembled. A thin aluminum foil strip is laminated between and securely bonded on each side to coextensive sheets of a thermoplastic copolymer of polyethylene modified by monomers containing reactive carboxyl groups, specifically a copolymer of ethylene and about 8 percent acrylic acid. The copolymer-metal-copolymer laminated strip is longitudinally folded around the core with the edges of the strip being brought together into juxtaposition and bonded by heat and pressure causing the thermoplastic copolymer to fuse and form a sealed longitudinal seam. A thin steel strip is longitudinally folded about the resulting structure, and then polyethylene containing 2.6 weight percent carbon black is extruded at heat-plastifying temperatures over the steel to form an outer jacket comprising a metallic layer over the inner shield.

EXAMPLE 3

A cable construction corresponding to that shown in FIG. 4 was simulated by making an extruded polyethylene tube 0.737 inch O.D. with 0.058 inch wall thickness. This tube was similar to the part 43 shown in FIG. 4 but, for convenience in making and testing, the wrapped multi-paired bundle of conductors (41 and 42) was omitted. A soft temper aluminum foil tape, 3 inches wide by 0.025 inch thick was coated on one side only with a thin layer about 0.004 inch thick of ethylene-acrylic acid copolymer having about 8 percent acrylic acid and about 6 melt index. The tape was folded longitudinally around the polyethylene tube core with the coated side outermost and enclosed in a tight-fitting outer jacket consisting of a polyethylene tube 0.824 inch I.D. with 0.058 inch wall thickness. The metal tape corresponded to part 45 and the outer polyethylene tube corresponded to part 47 of the cable diagrammed in FIG. 4.

A preliminary test was made of the resulting simulated cable in which the metal shield was not bonded to either the inner or outer jackets by attempting to bend a portion of that cable (about two feet long) around a 10-inch diameter mandrel which would provide a bending radius of 5 inches. The cable kinked and collapsed before the bend could conform to the 5-inch radius.

Another portion of the original simulated cable was placed in an oven and heated to 140° C. over a period of 90 minutes to thermally bond the coated aluminum shield to the outer jacket through the intermediate boundary layer of the ethylene-acrylic acid copolymer. The heated cable was cooled to room temperature. The resulting cable length was bent around the 10-inch diameter mandrel, the ends being pulled to an enclosed angle of less than 90°, and the bent cable was restraightened and similarly bent in the opposite direction to complete one bend cycle without any sign of damage to the cable. The bending operation was repeated several times. X-ray photographs were taken of the bend section. After 1½ bend cycles (i.e. in the third bent position), signs of wrinkling began to appear. After 3½ bend cycles (i.e. in the seventh bent position) wrinkling in the inside of the bend was very pronounced.

EXAMPLE 4

Another simulated cable was made up from the same materials as described in Example 3 except that a single thickness layer of a film tape 2 mils thick of the same ethylene-acrylic acid copolymer was folded longitudinally around the inner polyethylene tube, beneath the aluminum foil tape having its coated surface outermost and in contact with the outer polyethylene jacket. The assembled cable was heated in an oven to 140° C. over a period of 90 minutes to thermally bond the metal shield to both the inner polyethylene core and the outer polyethylene jacket. The resulting cable length was cooled to room temperature and tested in the manner of Example 3 by bending around the 10-inch diameter mandrel. X-ray photographs were taken. After 3½ bend cycles (i.e. in the seventh time bent position) the cable showed no wrinkling or any signs of damage.

The simulated cable was tested to destruction by repeated bending around the 10-inch diameter mandrel and straightening. Considerable heat was generated in the bend of the cable, and the cable was allowed to cool to room temperature after every ten bend cycles. After 61 cycles, the cable parts were apparently intact and unchanged except for a slight ellipticity in section at the middle of the bend; there was no wrinkling or separation of the parts. On the 62nd bend cycle, the entire cable broke in two across the cable at the same place in the middle of the bend, but the components of the pieces were still bonded to each other. Undoubtedly, after so many bends, the plastic and metal parts were thoroughly fatigued.

While these tests were carried out on a simulated cable lacking a main conductor core, cables constructed in accordance with the first paragraph of Example 2 give similarly advantageous results in resistance to damage by bending.

EXAMPLE 5

A submarine communications cable having the general structure diagrammed in FIG. 5 is constructed on a tempered steel core laid up densely from shaped rods into a circular section about 0.3 inch in diameter and enclosed in a copper foil tape 12 mils thick. The steel core is the tensile member and the copper is the main electric conductor member of the cable. Over the copper foil is tightly extruded a low density polyethylene insulation about 0.35 inch thick. Over this is longitudinally folded an aluminum strip or tape 20 mils thick having on both surfaces a layer about 2 mils thick of a copolymer of ethylene and acrylic acid, the copolymer being about 8 percent acrylic acid. The coating layer of copolymer advantageously protects the aluminum shielding material against oxidation and corrosion while exposed to air and moisture during storage and during use in cable manufacture. The longitudinally folded coated aluminum strip is slightly overlapped along its edges and provides the return conductor and shield member of the cable. A seamless outer jacket having a wall thickness of about 0.15 inch and composed of high density polyethylene having 2.6 percent carbon black blended therein is extruded at thermoplastifying temperature over the shielded core. During the extrusion and installation of the outer jacket, the copolymer coating on the metal shield is thereby fused into an adhesive and secure bond with the adjacent inner polyethylene insulation and outer polyethylene jacket, and the overlapped seam of the metal shield is thereby hermetically sealed. The resulting cable is mechanically strong, resistant to damage by bending, resistant to damage by intrusion of fluids into the cable, and resistant to separation of the respective parts.

EXAMPLE 6

A communications cable for burial in the ground is constructed with a bundle of signal wires enclosed in a polyethylene insulated core. Around such core is placed a copper shield in the form of a foil having both sides coated with a 2-mil layer of a conductive composition comprising about 30 percent of acetylene black and an ethylene-acrylic acid copolymer with about 8 percent acrylic acid, this coated shield being longitudinally folded about the core with an overlapped and crimped longitudinal seam. A seamless outer conducting jacket is extruded over the shielded core, the jacket composition being a copolymer of ethylene and about 20 percent ethyl acrylate containing about 40 percent of acetylene black. The heat of extrusion effects a secure bond between the metal shield and the adjacent plastic parts as well as an electrical conductive bond between the shield and the jacket, and hermetically seals the seam in the metal shield. The resulting cable is not only mechanically strong, resistant to damage on bending, etc., and resistant to damage by intrusion of water and air, but when buried in the earth, the cable is well protected from damage by stray currents generated therein by lightning bolts or other causes because the shield is well bonded electrically to the jacket which in turn is well grounded to the earth.

EXAMPLE 7

In a demonstration test of the advantages of this invention in conductively bonding the conductive jacket composition to the metal shield in cables of the kind described in Example 6, a preliminary test was conducted by molding a sheet 3.7 mm. thick of a cable jacket material composed of 80 percent ethylene-20 percent ethyl acrylate copolymer (melt index 3.5) and 30 percent acetylene black. The composition was tested between brass electrodes 5.08 cm. diameter. At electrode pressure of 22 g./cm.$^2$, the resistance of the plastic composition was 500 ohms; and 83 g./cm.$^2$ electrode pressure, the resistance was 260 ohms. A cable having only mechanically adjacent parts, even with considerable pressure therebetween is seen to have considerable electrical resistance.

In contrast to those results, a test of the present invention was prepared by molding a sheet 3.7 mm. thick of a composition of an ethylene copolymer with 8 percent acrylic acid and containing 35 percent acetylene black. A 4.5 cm. square piece of this sheet was placed between two aluminum sheets and heated in an oven at 140° C. for 15 minutes to bond the plastic between the metal sheets. At room temperature the aluminum sheets were strongly adherent to the plastic. The resistance between the aluminum sheets as electrodes across the plastic bonded thereto was only 11 ohms. Cables having metal shields conductively bonded to conductive plastics in accord with this invention have much less electrical resistance between these parts than do those with mere mechanical contact as shown in the test first described in this example.

EXAMPLE 8

A 5 mil film of a copolymer of ethylene and about 8 percent acrylic acid was placed on each side of an aluminum tape 12" x 3" x 0.006". The assembly was placed in a heated platen press and subjected to a temperature of about 175° C. and a pressure of about 30 tons for 3 minutes. The platens were covered with silicone rubber to prevent the copolymer from adhering to the platens. The press was cooled and the laminated article removed. The resulting laminate was a 6 mil layer of aluminum having adhered to each side thereof a 3.5 mil layer of the copolymer.

The above procedure was substantially repeated except that copper was substituted for the aluminum.

Both the aluminum and copper laminates, as prepared above, were tested for resistance to corrosion. On each laminate, a cut was made through the copolymer layer and into and exposing the metal. The laminates were exposed to a corrosive salt atmosphere in accordance with ASTM B–117–61 for a period of 11 months. At the end of this time, the laminates were removed, rinsed and dried. It was observed that the salt solution did not penetrate outwardly from the cut into the area between the copolymer and metal surfaces and further indicating the presence of an excellent adhesive bond between the metal and copolymer layers.

EXAMPLE 9

An electric cable is constructed having a conventional core of copper wires enclosed in a polyethylene jacket. The copolymer coated metal tape, as described in Example 8, is longitudinally folded about the cable core with slightly overlapping edges, after which an outer jacket of polyethylene is extruded at a heat plastifying temperature over the shielded core. The heat of extrusion of the outer jacket causes bonding of the metal shield to both the inner and outer jackets in contact therewith.

In place of the particular materials used in the foregoing examples there can be used other materials as hereinbefore described with advantageous results in making electrical conductors and cables of all kinds in which at least one metal part is securely bonded to at least one neighboring plastic part of the specified adhesive copolymer of ethylene and ethylenically unsaturated carboxylic acid.

The improved conductors and cables of this invention are useful, in ways that will be obvious to those skilled in the art, intransmission of electrical power and communication signals of various kinds such as telephony.

What is claimed is:

1. A cable shielding tape comprising a metallic strip having a minimum thickness of about 5 mils, a relatively thinner protective film bonded to each side of said strip, said film having a high resistivity, good resistance to chemicals and moisture, and being bonded to the said metallic strip without use of intermediate adhesive layers and with the bond to metal being achieved by the presence of carboxyl groups in said film to obtain a chemical bond, said film comprising a random copolymer of ethylene and a monomer with a reactive carboxyl group.

2. The shielding tape in accordance with claim 1 in which said monomer with a reactive carboxyl group comprises an acrylic acid.

3. The shielding tape according to claim 1 in which said copolymer includes an ester of acrylic acid.

4. The shielding tape according to claim 1 in which said strip comprises aluminum in the range of 5–10 mils thick and in which each of said films is in the range of 1–3 mils thick.

5. The shielding tape according to claim 1 in which said strip comprises copper in the range of 5–10 mils thick and in which each of said films is in the range of 1–3 mils thick.

6. A cable shielding tape comprising a metallic strip having adhered to both sides thereof a layer comprising a random copolymer of ethylene and an ethylenically unsaturated carboxylic acid.

7. The cable shielding tape according to claim 6 wherein the metallic strip is selected from the group consisting of aluminum and copper.

8. A cable shielding tape according to claim 6 wherein the ethylenically unsaturated carboxylic acid is acrylic acid.

9. A cable shielding tape according to claim 6 wherein at least one of said layers of the copolymer of ethylene and ethylenically unsaturated carboxylic acid contains from about 20 to about 50 percent by weight of an electrically conducting carbon composition.

10. The cable shielding tape according to claim 9 wherein the copolymer is a copolymer of ethylene and acrylic acid and the electrically conducting carbon composition is acetylene black.

11. The cable shielding tape according to claim 9 wherein the metallic strip is selected from the group consisting of aluminum and copper, the copolymer is a copolymer of ethylene and acrylic acid and the electrically conducting carbon composition is acetylene black.

12. The cable shielding tape according to claim 6 wherein the copolymer comprises ethylene and acrylic acid containing from about 1 to about 30 percent by weight acrylic acid.

13. The cable shielding tape according to claim 6 wherein the metallic strip has a thickness of from about 0.5 mil to about 25 mils and is selected from the group consisting of aluminum and copper and the copolymer comprises ethylene and acrylic acid containing from about 1 to about 30 percent by weight acrylic acid, said layer of copolymer having a thickness of from about 0.00025 to about 5 mils.

14. A cable shielding tape comprising a metallic strip having adhered to at least one side thereof a layer comprising a random copolymer of ethylene and an ethylenically unsaturated carboxylic acid.

15. A cable shielding tape according to claim 14 wherein the ethylenically unsaturated carboxylic acid is acrylic acid.

16. A cable shielding tape according to claim 14 wherein the random copolymer contains from 1 to about 30 percent by weight ethylenically unsaturated carboxylic acid.

17. A cable shielding tape according to claim 14 wherein the layer comprising the random copolymer contains from about 20 to about 50 percent by weight of an electrically conducting carbon composition.

18. A cable shielding tape according to claim 14 wherein the metallic strip is selected from the group consisting of aluminum and copper.

19. A cable shielding tape according to claim 14 wherein the ethylenically unsaturated carboxylic acid is acrylic acid and wherein the layer comprising the random copolymer contains from about 20 to about 50 percent by weight electrically conducting acetylene carbon black.

20. A cable shielding tape according to claim 14 wherein the metallic strip has a thickness of from about 0.5 mil to about 25 mils and is selected from the group consisting of aluminum and copper and wherein the random copolymer is copolymer of ethylene and acrylic acid containing from about 1 to about 30 percent by weight acrylic acid, said layer of random copolymer having a thickness of from about 0.00025 to about 5 mils.

References Cited

UNITED STATES PATENTS

| | | | |
|---|---|---|---|
| 2,808,352 | 10/1957 | Coleman et al. | 117—227 |
| 3,183,300 | 5/1965 | Jachimowicz et al. | 174—106 |
| 3,206,541 | 9/1965 | Jachimowicz | 174—105 |

FOREIGN PATENTS

| | | |
|---|---|---|
| 886,417 | 1/1962 | Great Britain. |
| 864,832 | 4/1961 | Great Britain. |
| 655,298 | 1/1963 | Canada. |

OTHER REFERENCES

Boonstra, B. B. S. T. and Bluestein, A. C.; Carbon Black Loaded, Cross-Linked Polyethylene, in Rubber Age, pp. 450–453, December 1959.

DANIEL J. FRITSCH, Primary Examiner

U.S. Cl. X.R.

117—68, 132 C, 161 UZ, 161 UT, 161 UC, 230, 232; 161—165, 167, 216, 218